C. WEATHERSON.
PNEUMATIC RIVETING TOOL.
APPLICATION FILED FEB. 5, 1910.
979,617.
Patented Dec. 27, 1910.
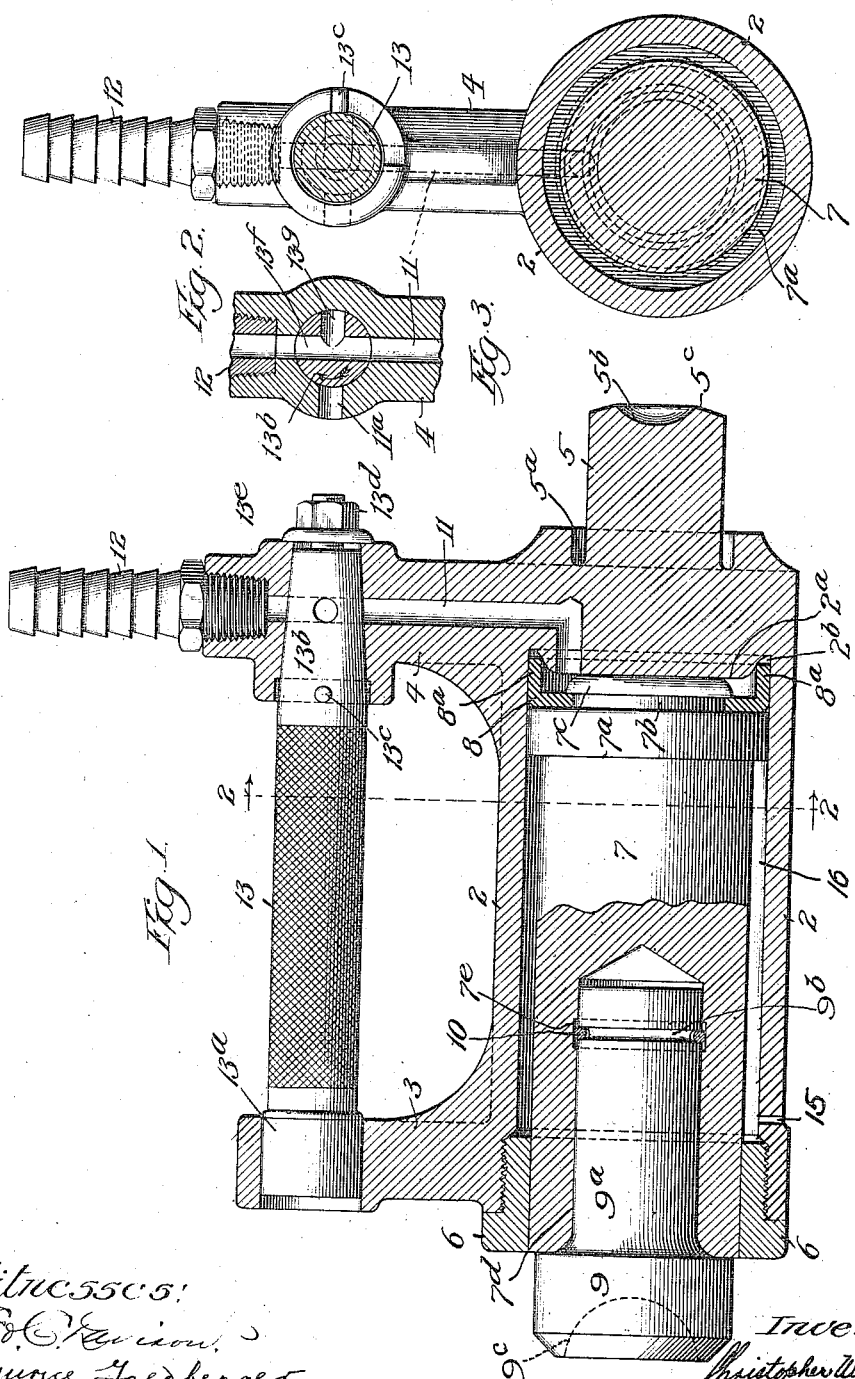

UNITED STATES PATENT OFFICE.

CHRISTOPHER WEATHERSON, OF CHICAGO, ILLINOIS, ASSIGNOR TO THE AMERICAN BRIDGE COMPANY, OF PITTSBURG, PENNSYLVANIA, A CORPORATION OF NEW JERSEY.

PNEUMATIC RIVETING-TOOL.

979,617.      Specification of Letters Patent.      Patented Dec. 27, 1910.

Application filed February 5, 1910. Serial No. 542,261.

*To all whom it may concern:*

Be it known that I, CHRISTOPHER WEATHERSON, of Chicago, in the county of Cook and State of Illinois, have invented certain new and useful Improvements in Pneumatic Riveting-Tools, of which the following is a full, clear, and exact description, reference being had to the accompanying drawings forming a part of this specification, in which—
Figure 1 is a longitudinal section with a part of the cylinder broken away and showing the riveting tool as assembled in accordance with my invention; Fig. 2 is a sectional end elevation on the line 2—2 of Fig. 1, and Fig. 3 is a detail of the valve construction.

When rivets are to be driven where the free space beyond the rivet head is so limited that the workman cannot hold the ordinary "dolly bar" against the head of the rivet with sufficient rigidity to retain the rivet in place under the blows of the riveting hammer on the opposite end of the rivet, it becomes necessary to provide other means for accomplishing this result.
My invention therefore relates to a fluid-operated device for performing the work. I am aware that pneumatic means of this nature have been provided, but many of them are designed in such manner that they are dependent for their operation upon screw threads and are constructed of many separate parts. The blows, shocks and vibration to which they are subjected tend to destroy the screw threads and loosen the joined parts, and therefore the principal object of my invention is to provide a device of this character which shall be as far as possible, cast in a single piece, without screw threads in any part subjected to shocks.
It frequently becomes necessary to use the device between girders which are separated by a greater space than that which will be spanned by the device with its piston 7, at its extreme travel, and in such cases an extension must be provided upon the rear of the device. It has been customary to provide means whereby a pipe or bar may be screw threaded into the rear of the device but under the shocks to which it is accustomed these threads become broken and the usefulness of the whole device is impaired. Another expedient has been the provision of an annular boss upon the rear of the device over which a hollow pipe was fitted, but it was found that the pipe would soon upset or become flanged and broken under the hammer blows.

Therefore a further object of the invention is the provision of means for extending the length of the device without the use of screw threads or the possibility of upsetting the extension.

A further object is the provision of valve mechanism in connection with the handle of the device in order that the same may be placed and operated with one hand.

A further object is the provision of means for attaching and also readily removing the rivet snap or part in contact with the rivet head while it is being headed upon its opposite end.

A further object is the provision of means upon the rear of the piston whereby the gland or packing may be securely attached without the aid of screws or separate parts, and whereby the cylinder is so formed that when the piston reaches the end of its inward travel the packing is positively retained in its natural shape.
With these objects in view, my invention comprises in a device of the class described, a shell and means for providing an extension thereof, cast in a single piece, a reciprocatory cylinder mounted in said shell, means within said cylinder for removably securing a rivet snap, integral means upon one end of the cylinder for attaching a gland or packing, a handle mounted upon said shell, and means connected with said handle for admitting fluid to and exhausting the same from the rear of said cylinder, and my invention consists in the devices and combinations of devices hereinafter described and particularly pointed out in the claims.
As shown in the drawings, 2 represents a cylinder or shell, having upstanding portions 3—4 and a projecting boss 5, these parts all being cast in a single piece. The open end of cylinder 2 is threaded and the gland 6 is fitted therein. A piston 7 is mounted to reciprocate within the cylinder 2, and as the form of this piston is important, I will describe the same in detail.

The rear of the piston has an annular enlargement 7ª, of a diameter slightly smaller than that of the inside diameter of the cylinder, the smaller portion of the piston being of the same diameter as that of the opening through the gland 6, secured in the outer end of the cylinder opening. On the extreme end of the piston 7, I provide an integral annular hub or boss 7$^b$, having thereon an annular enlargement 7$^c$. This is for the purpose of retaining in place the packing 8, which is cup shaped in form. Within the shell 2 and forming the end wall of the cylinder, I form a boss 2$^a$, against which the boss 7$^c$ abuts on its return stroke. Around the boss 2$^a$, I form an annular groove 2$^b$, within which the flange 8$^a$ of the packing 8 is adapted to seat when the piston is in the position shown in Fig. 1. In this way the packing never becomes jammed or worn other than by contact with the walls of the cylinder. Within the forward end of the piston I provide a recess 7$^d$, which is enlarged circumferentially for a short distance near its rear end, as at 7$^e$. Within the opening 7$^d$, I mount a rivet snap 9, having a shank 9$^a$ adapted to fit snugly within the opening 7$^d$. A peripheral groove 9$^b$ is cut in the shank 9$^a$, and within this groove I mount a spring ring 10. As shown in the drawings, this spring ring tends to expand out of the groove 9$^b$ and when the rivet snap is forced inwardly as far as it will go, this spring ring partially occupies the peripheral groove 7$^e$ in the piston 7, preventing the rivet snap from falling out of the piston. Within the front end of the rivet snap 9 I provide a concave recess 9$^c$, adapted to fit snugly over the head of the rivet. As this device will be used for all sizes of rivets, and as the sizes of the heads will vary, it becomes necessary to change the size of the rivet snap in each instance. This, it will be seen, may be easily accomplished by pulling smartly upon the rivet snap, thus forcing the spring ring 10 into the peripheral groove 9$^b$ and allowing the rivet snap to be removed. This spring ring is then removed and placed on another rivet snap and the snap forced into the opening 7$^d$ until the spring ring registers with the opening 7$^e$.

The upstanding portions 3—4 of the device are recessed to provide for a combination handle and valve-operating device of simple construction. Part 4 is provided with a port or passage 11, communicating with the space in the rear of the piston 7. This port or passage communicates with the nipple 12, to which is attached any suitable air hose (not shown). The novel handle 13 of my device has a circular end 13$^a$ and a conical end 13$^b$. A stop 13$^c$ is provided to limit the motion of the handle to a quarter turn, as shown in Fig. 2. The conical end 13$^b$ of the handle is seated within a corresponding recess in the part 4 and is retained in place by means of the nut 13$^d$ and washer 13$^e$. As shown in Fig. 3, the handle has two ports or passages, one, 13$^f$, allowing the air to enter at the rear of the piston 7 and the other, 13$^g$ allowing the exhaust of the air therefrom.

By referring to Fig. 3 it will be seen that the air is free to enter the rear of the cylinder through the passage 11 of the part 4 and the port 13$^f$ of the handle 13, and that upon revolving the handle a quarter turn, in the direction indicated by the arrow, that the port 13$^g$ will register with the passage 11 and that the port 13$^f$ will register with the passage 11$^a$, thus allowing the escape of air from the rear of the cylinder. Between the piston 7 and the casing 2 is the annular space 14 which communicates with the atmosphere through the vent 15, thus allowing the escape of air from the space 14 when the piston 7 is moved forward.

It will be seen that I have shown the enlargement 13$^a$ of the handle inside of the outer surface of the part 3. In this manner I obviate the danger of the valve becoming loosened or the handle broken by the knocking of any projecting part against obstructions.

In order to provide for an extension of the device when the space in which the same is to work is greater than the span of the device with its piston extended, I provide the boss 5 integral with the part 2, and at the base of the boss I provide a peripheral groove 5$^a$, for a purpose which I will now explain. A pipe is usually employed for extension, and where this pipe is threaded, the blows of the hammer soon break the threads, or where the pipe is merely slipped over the boss and allowed to abut a plane surface, the end thereof soon becomes upset. For this reason I have provided means whereby the pipe may be slipped over the boss and its end seated in the peripheral groove 5$^a$. The end of the boss has a concave portion 5$^b$ and a conical portion 5$^c$. In this manner I am enabled to get a suitable bearing surface, whether on the end of a corresponding rivet head or upon a plane surface.

I claim:

1. A device of the class described, comprising a shell, a rearwardly extending boss having an annular groove surrounding the same, and handle attaching means, all cast integral with said shell, in combination with a reciprocatory piston mounted within said shell, and carrying a rivet snap therein, a handle and means for admitting fluid to and exhausting the same from that portion of the shell to the rear of said piston, substantially as described.

2. In a device of the class described, a shell, handle supporting means upon said shell, a protruding boss also upon said shell, said boss being surrounded by an annular groove and having its outer end of truncated conical form and also provided with a concave depression, in combination with a reciprocatory piston within said shell and means for admitting fluid to and exhausting the same from that portion of the shell to the rear of said piston, substantially as described.

3. In a device of the class described, the combination of a shell, a rearwardly extending boss on said shell, an annular groove surrounding said boss and adapted to receive a tube or pipe, and reciprocatory means for engaging a rivet to be headed, substantially as described.

CHRISTOPHER WEATHERSON.

Witnesses:
 THOMAS E. JOY,
 HAROLD HART.